United States Patent

Kitamura et al.

[11] 4,373,388
[45] Feb. 15, 1983

[54] LIQUID LEVEL MONITORING DEVICE

[75] Inventors: Sotoo Kitamura; Sigeyuki Akita, both of Okazaki; Junji Kitagawa, Aichi, all of Japan

[73] Assignee: Nippon Soken, Inc., Nishio, Japan

[21] Appl. No.: 212,275

[22] Filed: Dec. 3, 1980

[30] Foreign Application Priority Data

Dec. 25, 1979 [JP] Japan .................. 54-181059[U]

[51] Int. Cl.$^3$ .................................. G01F 23/18
[52] U.S. Cl. ............................................. 73/301
[58] Field of Search ............................. 73/301, 299

[56] References Cited

U.S. PATENT DOCUMENTS

| | | | |
|---|---|---|---|
| 2,361,738 | 10/1944 | Bird | 73/301 |
| 3,286,523 | 11/1966 | Barrows et al. | 73/301 |
| 4,112,760 | 9/1978 | Ishiwata | 73/299 |
| 4,227,410 | 10/1980 | Ruben et al. | 73/301 |

Primary Examiner—Edward R. Kazenske
Assistant Examiner—Joseph W. Roskos

Attorney, Agent, or Firm—Cushman, Darby & Cushman

[57] ABSTRACT

A liquid level monitoring device includes a casing arranged to be immersed in liquid stored within a container, the casing having first and second ports and being integrally provided with a support member to be attached to the inner wall of the container. A flexible diaphragm is assembled to form first and second chambers in the casing, the first chamber being communicated with the atmospheric air through the first port from which an elongated tube extends into the exterior of the container, and the second chamber permitting the immerse of liquid through the second port thereinto such that an amount of the atmospheric air is compressed within the second chamber in dependence upon an amount of the stored liquid to flex the diaphragm by a pressure difference between the chambers. A pressure transducer is provided to detect the rate of flexure of the diaphragm so as to generate an electric signal indicative of the liquid surface level from a control circuit. An indicator is responsive to the electric signal from the control circuit to indicate the stored liquid surface level.

11 Claims, 3 Drawing Figures

LIQUID LEVEL MONITORING DEVICE

BACKGROUND OF THE INVENTION

The present invention relates to liquid level monitoring devices, and more particularly to a liquid level monitoring device for electrically detecting displacement of the surface level of liquid stored in a container.

As one of conventional liquid level monitoring devices of this kind, a fuel gauge has been proposed, which comprises a potentiometer mounted on a portion of a liquid fuel tank and a float member floated on the surface of liquid fuel stored within the tank and slidably in contact with a movable element of the potentiometer. With the fuel gauge, a resistance value of the potentiometer changes in dependence upon displacement of the float member to detect displacement of the surface level of the stored liquid fuel. For the purpose of detecting the liquid fuel surface level, it is required to keep the float member in contact with the movable element of the potentiometer even when the float member is greatly apart from the potentiometer due to decrease of the stored liquid fuel. Additionally, it is required that the weight and capacity of the float member may balance with buoyancy of the liquid fuel to ensure proper changes of the resistance value of the potentiometer. For the above reasons, the fuel gauge may not be constructed in a small size, and the detectable range of the fuel gauge is limited. It has been also observed that erroneous operation of the fuel gauge is caused by defacement in a sliding connection between the float member and the potentiometer.

SUMMARY OF THE INVENTION

It is, therefore, a primary object of the present invention to provide a liquid level monitoring device for use in a container capable of reliably detecting displacement of the surface level of liquid stored within the container in a compact construction by utilizing a pressure transducer.

Another object of the present invention is to provide a liquid level monitoring device for use in a container, having the above-mentioned characteristics, capable of detecting displacement of the surface level of liquid stored within the container in a wider range.

A further object of the present invention is to provide a liquid level monitoring device for use in a container of magnetic material in which a support member of the device is provided with a permanent magnet to be attached to a desired portion of the inner wall of the container.

According to the present invention, the above objects are accomplished by provision of a liquid level monitoring device for use in a container in which an amount of liquid is stored. The monitoring device comprises a casing arranged to be immersed in the stored liquid within the container, the casing having first and second ports and being integrally provided with a support member to be attached to a portion of the inner wall of the container, an elongated tube connected at its one end to the first port and positioned at its other end externally of the container, and a flexible diaphragm assembled within the casing to subdivide the interior of the casing into first and second chambers respectively in open communication with the first and second ports, the first chamber being communicated with the atmospheric air through the tube, and the second chamber permitting the immerse of liquid through the second port thereinto such that an amount of the atmospheric air is compressed within the second chamber in dependence upon the amount of the stored liquid and that the diaphragm is flexed by a difference in pressure between the first and second chambers. The monitoring device further comprises electric circuit means including a pressure transducer secured to the diaphragm to detect the rate of flexure of the diaphragm and a control circuit to produce an electric signal indicative of the liquid surface level dependent on the detected rate of flexure of the diaphragm, and an indicator responsive to the electric signal from the control circuit for indicating the surface level of the stored liquid.

It is preferable that the second port of the casing is integrally formed with a tubular extension having an open end to be located adjacent to the bottom of the container, and the support member of the casing is provided with an annular permanent magnet which surrounds the tubular extension of the second port and is arranged to be attached to the inner wall of container in the form of a fuel tank of magnetic material.

It is further preferable that an outer casing is coupled with the support member of the first-named casing in a fluid-tight manner to contain the first-named casing therein, and the control circuit is assembled within a space between the first-named casing and the outer casing.

BRIEF DESCRIPTION OF THE DRAWINGS

Additional objects and advantages of the present invention will be more readily apparent from the following detailed description of a preferred embodiment thereof when taken together with the accompanying drawings in which.

DESCRIPTION OF THE PREFERRED EMBODIMENT

Figure 1:
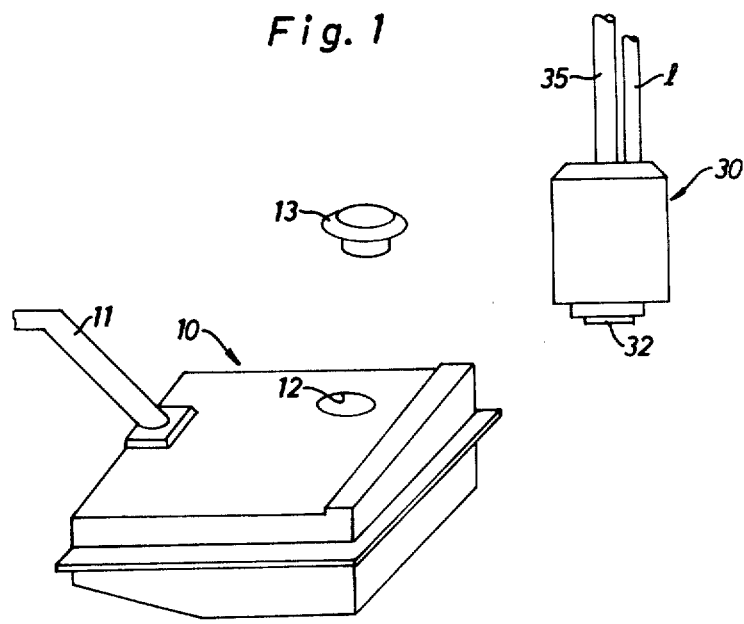
FIG. 1 illustrates an elevational view of a liquid level monitoring device in accordance with the present invention to be adapted to a fuel tank of an automotive vehicle.

Referring now to FIG. 1 of the drawings, there is schematically illustrated a liquid level monitoring device 30 in accordance with the present invention for a conventional fuel tank 10 of an automotive vehicle. The fuel tank 10 is made of magnetic material such as steel plate and the like and provided thereon with a pipe 11 through which an amount of liquid fuel in the form of gasoline 20 (see FIG. 2) is supplied into the fuel tank 10. The fuel tank 10 is also provided at its upper wall with an opening 12 through which a conventional fuel gauge (not shown) for detecting the surface or liquid level of gasoline 20 as an amount of gasoline 20 stored within the fuel tank 10 is to be inserted into the fuel tank 10. In the embodiment, the opening 12 of fuel tank 10 is utilized to insert the liquid level monitoring device 30 into the fuel tank 10 in replacement of the conventional fuel gauge. In addition, the reference numeral 13 indicates a cap member to hermetically close the opening 12 of fuel tank 10.

Figure 2:
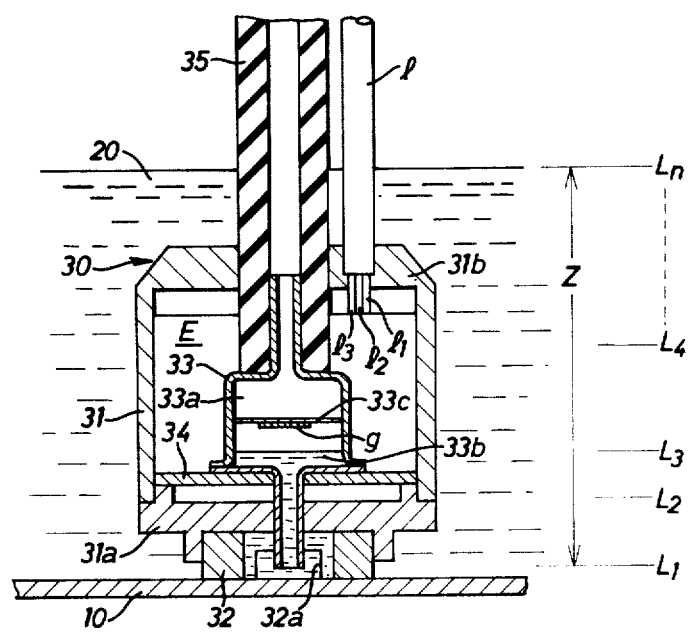
FIG. 2 illustrates a longitudinal cross-section of the monitoring device which is immersed in liquid fuel stored within the fuel tank.

FIG. 2 illustrates a vertical cross-section of the liquid level monitoring device 30 which is immersed in the gasoline 20 stored within the fuel tank 10. The monitoring device 30 comprises an outer cup-shaped casing 31 which is closed by a support member 31a in a fluid-tight manner to accommodate an inner casing 33 therein. The support member 31a is integrally provided with an annular permanent magnet 32 to be magnetically attached to the bottom of fuel tank 10. The permanent magnet 32 is provided at its outer periphery with radial slots 32a through which the gasoline 20 in the fuel tank 10 flows into and out from the magnet 32. The permanent magnet 32 also acts as a weight such that the monitoring device 30 is immersed into the gasoline 20 through the opening 12 of fuel tank 10 and drops toward the bottom of fuel tank 10. In addition, the outer diameter of the outer casing 31 is smaller than the inner diameter of the opening 12 of fuel tank 10.

The inner casing 33 is mounted on the inner surface of the support member 31a by way of a printed circuit board 34. At the outside of inner casing 33, the outer casing 31 also includes a plurality of electric elements which are connected on the printed circuit board 34 to form an electric circuit E. Within the inner casing 33, a flexible silicone-diaphragm 33c is assembled to subdivide the interior of casing 33 into first and second chambers 33a and 33b. The first chamber 33a has a first port which is integrally formed with a tubular extension having an open end connected to an inner end of a rubber tube 35. The rubber tube 35 extends through an upper wall 31b of outer casing 31 and the opening 12 of fuel tank 10 to open into the exterior of fuel tank 10 at its outer end. The second chamber 33b has a second port which is integrally formed with a tubular extension which extends through the printed circuit board 34 and the support member 31a into the gasoline 20 within the annular permanent magnet 32. In the embodiment, the tubular extension of the second port has an open end which is located in close proximity to the bottom of fuel tank 10 such that relative liquid fluid communication between the annular permanent magnet 32 and the second port of chamber 33b is easily permitted.

In the above-noted inner casing 33, the atmospheric pressure $P_A$ is applied through the rubber tube 35 into the first chamber 33a, whereas the gasoline 20 in the annular permanent magnet 32 immerses into the second chamber 33b due to gravity of all the gasoline 20 in fuel tank 10 such that the atmospheric air in the second chamber 33b is compressed to produce pressure $P_B$ in the second chamber 33b. This means that the flexible silicone-diaphragm 33c is flexed by a difference $(P_B - P_A)$ in pressure between the second and first chambers 33b and 33a. As is conventionally known, the pressure difference $(P_B - P_A)$ is substantially proportional to a distance between the surface level $L_n$ (n = 1, 2, ...) of gasoline 20 and the open end of the tubular extension of the second port. In other words, the pressure difference $(P_B - P_A)$ is substantially equal to liquid pressure which is given by an amount of gasoline 20 defined on a basis of the distance Z in the fuel tank 10. From this description, it will be easily understood that the pressure difference $(P_B - P_A)$ or the rate of flexure of silicone-diaphragm 33c is defined in relation to displacement of the liquid level of gasoline 20.

Figure 3:
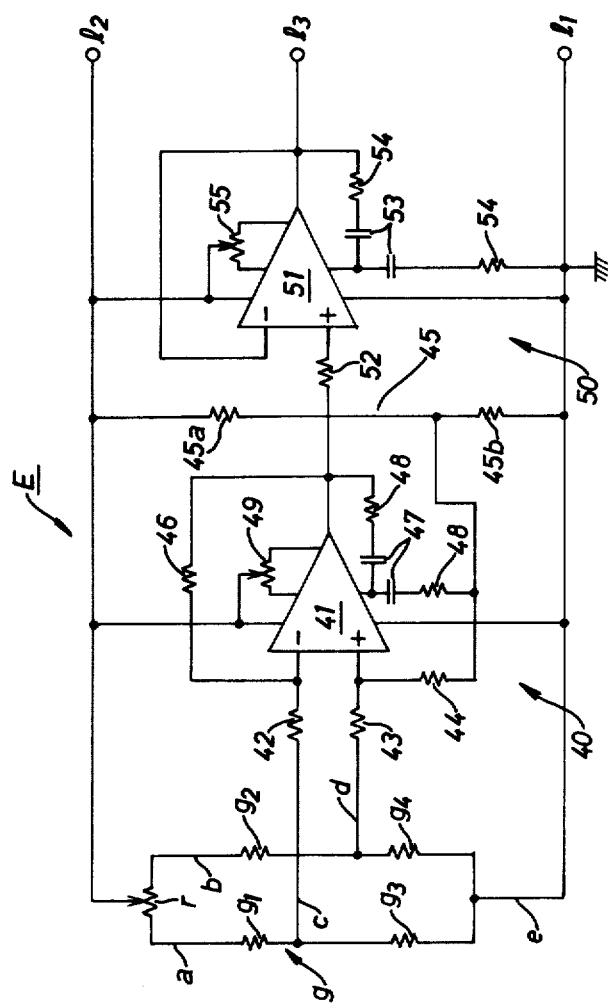
FIG. 3 shows schematically an electric circuit of the monitoring device.

A pressure transducer g is provided on the silicone-diaphragm 33c and formed by a semiconductor chip which has thereon strain gauges $g_1$, $g_2$, $g_3$ and $g_4$ (see FIGS. 3 and 4). When each of the strain gauges $g_1$ to $g_4$ is flexed in accordance with the rate of flexure of silicone-diaphragm 33c, a resistance value of each strain gauge is changed into a value defined by the rate of flexure of each strain gauge. In the embodiment, the strain gauges $g_1$ and $g_2$ are connected at their common terminals c and d respectively in series with the strain gauges $g_3$ and $g_4$ to provide a full-bridge circuit. Between the respective remaining terminals a and b of strain gauges $g_1$ and $g_2$, a variable resistor r of electric circuit E is connected on the printed circuit board 34 to adjust the condition for balance of the full-bridge circuit. A common terminal e between the strain gauges $g_3$ and $g_4$ is connected on the printed circuit board 34 to one end of a loading wire $l_1$ of a cable 1 which extends into the exterior of fuel tank 10 together with the rubber tube 35 (see FIG. 2). In addition, a slider of variable resistor r is connected on the printed circuit board 34 to a leading wire $l_2$ of cable 1 to receive a DC voltage from a DC power source (not shown) located at the outside of the fuel tank 10.

As shown in FIG. 3, the electric circuit E is provided with an amplifying circuit 40 which includes a differential amplifier 41 connected to the pressure transducer g and a voltage divider 45. The voltage divider 45 is formed by a series connection of resistors 45a, 45b such that it receives the DC voltage from the DC power source across the leading wires $l_1$, $l_2$ of cable 1 to produce a divided reference voltage at a common or output terminal between the resistors 45a, 45b. The differential amplifier 41 is provided with a first input terminal connected through an input resistor 42 to the common terminal c between the strain gauges $g_1$, $g_3$ and also with a second input terminal connected through an input resistor 43 to the common terminal d between the strain gauges $g_2$, $g_4$ and connected through an input resistor 44 to the output terminal of voltage divider 45. Furthermore, the differential amplifier 41 includes a feedback resistor 46 which is connected between the first input and output terminals of amplifier 41. When the pressure transducer g detects the rate of flexure of silicone-diaphragm 33c to produce a detected voltage between the common terminals c and d, the differential amplifier 41 serves to amplify a difference between the detected and reference voltages respectively from the pressure transducer g and voltage divider 45 to produce an amplified voltage with high impedance at its output terminal. In addition, a variable resistor 49 is utilized to adjust offset in the differential amplifier 41, and capacitors 47 and a resistor 48 act as elements for compensation of phase in the amplifier 41.

An impedance converter 50 includes an operational amplifier 51 which is provided with first input and output terminals connected directly to each other and with a second input terminal connected through an input terminal 52 to the output terminal of differential amplifier 41. The output terminal of operational amplifier 51 is also connected on the printed circuit board 34 to one end of a leading wire $l_3$ of cable 1. With the impedance converter 50, the operational amplifier 51 serves to convert the amplified voltage from amplifying circuit 40 in relation to impedance so as to produce an output voltage with low impedance at its output terminal. An indicator (not shown) is located within a passenger compartment of the vehicle and serves to receive the output voltage from the impedance converter 50 through the leading wire $l_3$ of cable 1 so as to indicate the liquid level $L_n$ as an amount of gasoline 20 stored within the fuel tank 10. In addition, a variable resistor 55 acts as an element for adjusting offset in the operational amplifier 51, and capacitors 53 and resistors 54 are utilized to compensate phase in the amplifier 51. The above-noted connections among the electric elements of amplifying circuit 40 and impedance converter 50 are conducted on the printed circuit board 34. The connections between the input resistor 42 of amplifying circuit 40 and the common terminal c of strain gauges $g_1$, $g_3$ and between the input resistor 43 of amplifying circuit 40 and the common terminal d of strain gauges $g_2$, $g_4$ are also conducted on the printed circuit board 34.

For installation of the monitoring device 30 to the fuel tank 10 containing an amount of the gasoline 20 defined by the liquid level $L_n$ shown in FIG. 2, the monitoring device 30 is inserted through the opening 12 into the fuel tank 10, and the rubber tube 35 is also inserted through the opening 12 into the fuel tank 10 together with the cable 1 so that the monitoring device 30 drops due to its gravity against buoyancy of gasoline 20 and is attached to the bottom of fuel tank 10 by magnetic force of permanent magnet 32. This means that separation of the monitoring device 30 from the bottom of fuel tank 10 is avoided due to magnetic force of permanent magnet 32 in spite of various mechanical vibrations of the vehicle. Thereafter, the opening 12 of fuel tank 10 is hermetically closed by the cap member 13 by way of the rubber tube 35 and cable 1. At this stage, the atmospheric pressure $P_A$ is present in the fuel tank 10 above the liquid level $L_n$, as understood from the above description. The atmospheric pressure $P_A$ is also applied to the first chamber 33a of inner casing 33, whereas the gasoline 20 partly immerses into the second chamber 33b of casing 33 up to a liquid level $L_3$ so that the atmospheric air contained previously in the second chamber 33b is compressed to produce pressure $P_B$ in the second chamber 33b, as previously described. Thus, the flexible silicone-diaphragm 33c of casing 33 is flexed due to a difference $(P_B - P_A)$ in pressure between the chambers 33b, 33a so that each resistance value of the strain gauges $g_1$ to $g_4$ becomes a value defined by the rate of flexure of silicone-diaphragm 33c, as previously described.

When the DC voltage of the DC power source is applied to the monitoring device 30 upon actuation of a manual switch (not shown), the above-noted resistance value of each of strain gauges $g_1$ to $g_4$ is produced as a detected voltage from the common terminals c and d of pressure transducer g and applied to the amplifying circuit 40. Then, a difference between the detected and reference voltages respectively from the transducer g and voltage divider 45 is amplified by the differential amplifier 40 and applied as an amplified voltage to the impedance converter 50. Subsequently, the amplified voltage from amplifying circuit 40 is converted by the operational amplifier 51 in relation to impedance and, in turn, applied as an output voltage with low impedance to the indicator through the leading wire $l_3$ of cable 1. Thus, the indicator is responsive to the output voltage from impedance converter 50 to indicate the liquid level $L_n$ to an operator of the vehicle as an amount of gasoline 20 existing in the fuel tank 10.

When the gasoline 20 in the fuel tank 10 is consumed during travel of the vehicle to lower the liquid level $L_n$ to liquid levels $L_4$, $L_3$ and $L_2$ successively, the gasoline 20 within the second chamber 33b of casing 33 returns through the annular permanent magnet 32 into the fuel tank 10 in accordance with decrease of gravity of all the gasoline 20 remained in the fuel tank 10. This means that the rate of compression of the air in the second chamber 33b is decreased in accordance with the lowering of the liquid level of gasoline 20 to conduct drop of the pressure $P_B$ in the second chamber 33b. Then, the rate of flexure of silicone-diaphragm 33c is decreased due to drop of the pressure $P_B$ in the second chamber 33b so that an amount of change of the resistance value of each strain gauge is decreased to drop the detected voltage from pressure transducer g. Thus, the impedance converter 50 cooperates with the amplifying circuit 40 in relation to drop of the detected voltage from transducer g to conduct successive drop of the output voltage therefrom. As a result, successive lowering of the liquid level $L_n$ to the liquid levels $L_4$, $L_3$ and $L_2$ is indicated by the indicator due to drop of the output voltage from impedance converter 50 as the actual amount of gasoline 20 which is remained within the fuel tank 10 in relation to travelling distance of the vehicle.

When the gasoline 20 is further consumed during travel of the vehicle to lower the liquid level $L_2$ to a liquid level $L_1$, the gasoline 20 within the second chamber 33b is fully returned through the annular permanent magnet 32 into the fuel tank 10 so that the pressure $P_B$ in the second chamber 33b drops to the atmospheric pressure $P_A$ to make the rate of flexure of silicone-diaphragm 33c zero. Then, an amount of change of each resistance value of strain gauges $g_1$ to $g_4$ is made zero due to no flexure of silicone-diaphragm 33c to drop the detected voltage from transducer g to zero. Thus, the output voltage from impedance converter 50 drops to zero under control of the amplifying circuit 40 responsive to the detected voltage of zero from transducer g so that the indicator indicates the liquid level $L_1$ as the fact that a remaining amount of gasoline 20 in the fuel tank 10 is substantially zero. In this case, the fact that a remaining amount of gasoline 20 in the fuel tank 10 is substantially zero is precisely indicated by the indicator because the tubular extension of the second port of chamber 33c is in close proximity to the bottom of tank 10 at its open end, as previously described.

In the above operational made, it will be also understood that the pressure difference $(P_B - P_A)$ between the second and first chambers 33b and 33a is not affected by fluctuation of the atmospheric pressure, because the atmospheric pressure always acts on the surface level of gasoline 20, as previously described. This means that the surface level of gasoline 20 can be precisely detected by the monitoring device 30 in spite of fluctuation of the atmospheric pressure. Additionally, in case of removal of the monitoring device 30 from the fuel tank 10, the operator has only to pull the rubber tube 35 with the cable 1 out of the fuel tank 10 against magnetic force of the permanent magnet 32.

For detection of the surface level of gasoline 20 in the fuel tank 10, the monitoring device 30 may be magnetically attached to, for example, a lower portion of a side wall of fuel tank 10 or a drain cock provided on the bottom of fuel tank 10. In this case, the printed circuit board 34 and the electric elements of circuit E may be located outside the fuel tank 10 to eliminate the outer casing 31 such that compactness of the monitoring device 30 is facilitated to prevent narrowing of a range of the liquid level which the monitoring device 30 can detect.

Although in the above embodiment the liquid level monitoring device 30 is adapted to the fuel tank 10, it may also be utilized to detect the surface level of various liquids such as oil contained in a reservoir for the vehicle, and the like. In case of detection of the surface level of static liquid in a container, the permanent magnet 32 may be replaced with a weight having predetermined gravity or may be eliminated to directly secure the outer casing 31 to the bottom of the container.

For practice of the present invention, the silicone-diaphragm 33c may be replaced with a flexible diaphragm formed by rubber, plastics, or the like. In this case, the pressure transducer g may be formed by each pair of resistors and semiconductor strain gauges to provide a bridge circuit.

Having now fully set forth both structure and operation of a preferred embodiment of the concept underlying the present invention, various other embodiments as well as certain variations and modifications of the embodiment herein shown and described will obviously occur to those skilled in the art upon becoming familiar with said underlying concept. It is to be understood, therefore, that within the scope of the appended claims, the invention may be practiced otherwise than as specifically set forth herein.

What is claimed is:

1. A liquid level monitoring device adapted for use in a container in which an amount of liquid is stored, said monitoring device comprising:
    a casing arranged to be immersed in the stored liquid within said container, said casing having first and second ports and being integrally provided with a support member to be attached to a portion of the inner wall of said container, and said second port being integrally formed with a tubular extension having an open end to be located adjacent to the bottom of said container;
    an elongated tube connected at its one end to said first port and positioned at its other end externally of said container;
    a flexible diaphragm assembled within said casing to subdivide the interior of said casing into first and second chambers respectively in open communication with said first and second ports, said first chamber being communicated with the atmospheric air through said tube, and said second chamber permitting the immerse of liquid through said second port thereinto such that an amount of the atmospheric air within said second chamber is compressed in dependence upon the amount of the stored liquid and that said diaphragm is flexed by a difference in pressure between said first and second chambers;
    electric circuit means including a pressure transducer secured to said diaphragm to detect the rate of flexure of said diaphragm and including a control circuit to produce an electric signal indicative of the liquid surface level dependent upon the detected rate of flexure of said diaphragm; and
    an indicator responsive to the electric signal from said control circuit for indicating the surface level of the stored liquid.

2. A liquid level monitoring device as claimed in claim 1, wherein said container is made of magnetic material, and said support member of said casing is provided with a permanent magnet to be attached to the inner wall of said container.

3. A liquid level monitoring device as claimed in claim 1, wherein said container is made of magnetic material, and said support member of said casing is provided with an annular permament magnet which surrounds said tubular extension of said second port and is arranged to be attached to the inner wall of said container.

4. A liquid level monitoring device as claimed in claim 1, wherein said elongated tube is a flexible tube of elastic material.

5. A liquid level monitoring device as claimed in claim 1, further comprising an outer casing coupled with said support member in a fluid-tight manner to contain said first-named casing therein, said control circuit of said electric circuit means being assembled within a space between said first-named and outer casings.

6. A liquid level monitoring device as claimed in claim 5, wherein said container is made of magnetic material, and said support member of said first-named casing is provided with a permanent magnet to be attached to the inner wall of said container.

7. A liquid level monitoring device as claimed in claim 5, wherein said container is made of magnetic material, and said support member of said first-named casing is provided with an annular permanent magnet which surrounds said tubular extension of said second port and is to be attached to the inner wall of said container.

8. A liquid level monitoring device for use in a fuel tank in which an amount of liquid fuel is stored, said monitoring device comprising:
    an inner casing arranged to be immersed in the stored fuel within said tank, said inner casing having first and second ports and being integrally provided with a support member to be attached to a portion of the inner wall of said fuel tank;
    an outer casing coupled with said support member in a fluid-tight manner to contain said inner casing therein;
    an elongated flexible tube of elastic material connected at its one end to said first port and extending through said outer casing to be positioned at its other end externally of said fuel tank;
    a flexible diaphragm assembled within said inner casing to subdivide the interior of said inner casing into first and second chambers respectively in open communication with said first and second ports, said first chamber being communicated with the atmospheric air through said flexible tube, and said second chamber permitting the immerse of liquid fuel through said second port thereinto such that an amount of the atmospheric air is compressed within said second chamber in dependence upon the amount of the stored liquid fuel and that said diaphragm is flexed by a difference in pressure between said first and second chambers;
    electric circuit means including a pressure transducer secured to said diaphragm to detect the rate of flexure of said diaphragm and including a control circuit which is assembled within a space between said inner and outer casings to produce an electric signal indicative of the surface level of the stored liquid fuel dependent upon the detected rate of flexure of said diaphragm; and
    an indicator responsive to the electric signal from said control circuit for indicating the surface level of the stored liquid fuel within said tank.

9. A liquid level monitoring device as claimed in claim 8, wherein said second port of said inner casing is integrally formed with a tubular extension having an open end to be located adjacent to the bottom of said fuel tank.

10. A liquid level monitoring device as claimed in claim 9, wherein said fuel tank is made of magnetic material, and said support member of said inner casing is provided with an annular permanent magnet which surrounds said tubular extension of said second port and is arranged to be attached to the inner wall of said fuel tank.

11. A liquid level monitoring device as claimed in claim 1 or 8, wherein said flexible diaphragm is in the form of a flexible silicone-diaphragm, and said pressure transducer includes a semiconductor chip secured to said silicone-diaphragm which is provided thereon with a plurality of strain gauges forming a fullbridge circuit.

* * * * *